Figure 1:
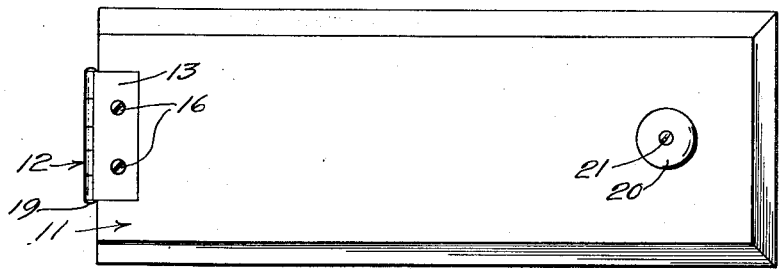

Jan. 30, 1940.　　　　C. D. NEWLAND　　　　2,188,842

HAMBURGER SHAPING DEVICE

Filed Aug. 24, 1938

Inventor

CLARENCE D. NEWLAND,

By Kimmel & Crowell

Attorneys

Patented Jan. 30, 1940

2,188,842

UNITED STATES PATENT OFFICE 2,188,842

HAMBURGER SHAPING DEVICE

Clarence Donald Newland, Coulee Dam, Wash.

Application August 24, 1938, Serial No. 226,592

4 Claims. (Cl. 107—15)

This invention relates to a means for shaping and making patties and more particularly to a means for making and shaping ground meat which is used for the making of hamburger patties or the like.

An object of this invention is to provide a combined mold and compressing means which is exceedingly simple in construction and which is adapted to shape and compress one or more meat patties.

Another object of this invention is to provide a device of this character which will make uniform patties for use in hamburger sandwiches and the like, the patties having a uniform thickness and diameter so that the size of the patties may be made to conform with the size of the bread or rolls with which the cooked pattie is associated in order to form a hamburger sandwich.

A further object of this invention is to provide a device of this kind which is constructed of few parts and which is adapted to speed up the shaping of patties for use in making hamburgers or the like, the device being so constructed that it may be readily and thoroughly cleansed, and may be operated by mounting the same on a table or other plane surface.

To the foregoing objects and to others which may hereinafter appear, the invention consists of the novel construction, combination and arrangement of parts as will be more specifically referred to and illustrated in the accompanying drawing, wherein is disclosed an embodiment of the invention, but it is to be understood that changes, variations and modifications may be resorted to which fall within the scope of the invention as claimed.

Figure 2:
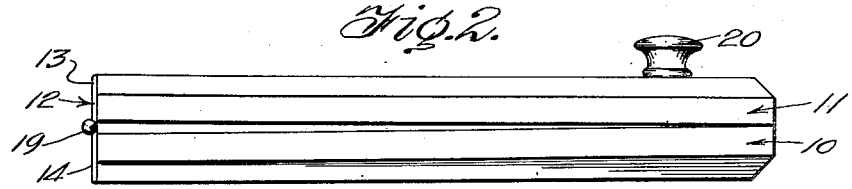
Figure 3:
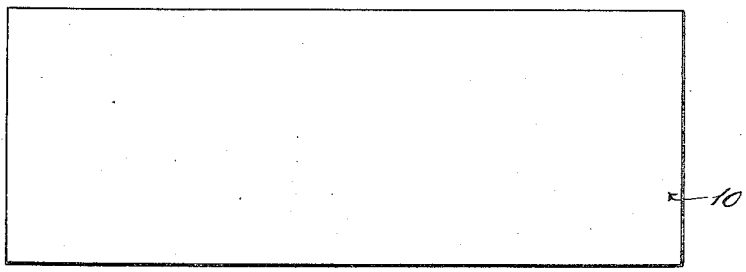
Figure 4:
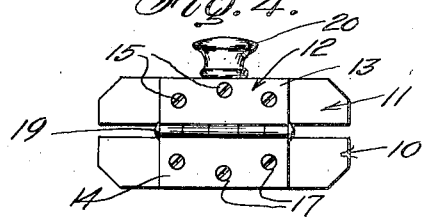
Figure 5:
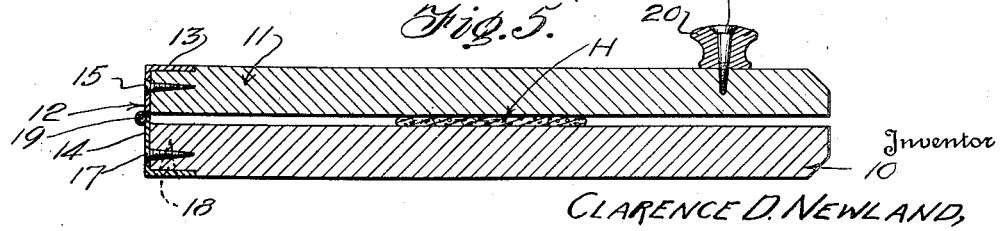

In the drawing:

Figure 1 is a detail top plan of a device constructed according to an embodiment of this invention, Figure 2 is a detail side elevation of the device, Figure 3 is a detail top plan of the inside of the base portion, Figure 4 is a detail rear elevation of the device, and Figure 5 is a longitudinal section taken substantially through the center of the device.

Referring to the drawing, the numeral 10 designates generally a base member which in top plan is substantially rectangular in configuration. The base member 10 is mobile, that is to say freely movable and it is adapted to be removedly mounted on a suitable support (not shown) therefor, and it is capable of being conveniently shifted to any suitable point and the desired position on the support. A compressing member generally designated as 11 is arranged over and has substantially the same configuration as the base member 10 is hingedly secured at one end thereof to the corresponding end of the base member 10. A hinge structure 12 comprising an L-shaped leaf member 13 and an L-shaped leaf member 14 hingedly connects the compressing or movable member 11 to the base member 10.

Each leaf member includes a vertically and a horizontally disposed leg. The horizontal leg of the leaf member 13 extends inwardly from the upper end of the vertical leg of member 13. The horizontal leg of the leaf member 14 extends inwardly from the lower end of the vertical leg of member 14. The vertical leg of the leaf member 13 is positioned against the rear or inner end edge of the compressing member 11 and depends from the lower or inner face of the latter. The horizontal leg of the leaf member 13 is countersunk (Figure 5) in the upper face of the compressing member 11. The vertical and horizontal legs of the leaf member 13 are secured to the compressing member 11 by the screws 15, 16 respectively (Figures 1, 4, 5) which have their heads countersunk in the member 13. The member 11 preferably will be constructed of wood. The vertical leg of the leaf member 14 is positioned against the rear end of the base member 10 and extends above the upper or inner face of the latter. The horizontal leg of the leaf member 14 is countersunk (Figure 5) in and is flush with the lower or outer face of the base member 10 whereby the latter will evenly or squarely seat on a support. The vertical and horizontal legs of the leaf member 14 are secured to the base member 10 by the screws 17, 18 respectively (Figures 4 and 5) which have their heads countersunk in the member 14. The lower end of the vertical leg of the member 13 and the upper end of the vertical leg of the member 14 terminate in aligned hinge barrels (Figures 1, 2, 4 and 5) which are offset outwardly with respect to the inner end edges of the members 10, 11. Extending through the aligned barrels is a pintle 19.

The pintle 19 for the hinge 12 is disposed adjacent to the confronting faces of the base member 10 and the compressing member 11, and in the present instance, the pintle 19 and the hinge barrels therefor are disposed outwardly of the inner ends of the two members 10 and 11. At the hinged inner ends of the members 10 and 11, they permanently are spaced apart by the construction and arrangement of the hinge members 13, 14 as shown in Figures 2 and 4. The compressing member 11 normally extends at a downward inclination from its hinged inner end to its outer end and has its outer end terminal portion of its lower or inner face seated upon the outer end terminal portion of the upper or inner face of the base member 10.

The upper or compressing member 11 is provided adjacent the outer or free end thereof with a knob 20 which is secured to the compressing member 11 by means of a screw or fastening member 21.

In the use of this device, the ground meat used in the formation of hamburgers is placed on the upper surface of the base member 10 as shown at H in Figure 5. The compressing member 11 is then moved downwardly and engaged with the material H and pressed to the desired degree so that the patty H will be flattened out to the desired degree. The compressed and shaped patty H may then be lifted off of the base 10 by sliding a knife therebeneath and treated or cooked in the usual manner. With the use of a device of this kind, the meat patties will have a uniform configuration and a substantially uniform thickness so that the proprietor of the restaurant or sandwich stand will be able to check more closely on the quantity of meat required for a particular number of patties and at the same time the formation of these patties can be effected quickly and without any waste of material. Where it is desired to make more than one patty at a time, the meat may be placed on the base 10 in spaced apart relation and the upper member 11 rocked downwardly on the hinge 12 after the manner of a hammer or press.

What I claim is:

1. A patty shaping device comprising a horizontally disposed rectangular freely movable base member having a flat uninterrupted upper face, a rectangular compressing member disposed in superposed relation with respect to said other member formed with a flat uninterrupted lower face, said compressing member normally inclined downwardly with respect to the horizontal, having its outer end terminal portion of its lower face normally seated upon the outer end terminal portion of the upper face of the base member and the remaining portion of its lower face permanently spaced from the remaining portion of the upper face of the base member, said members corresponding in width and length, and a structure for hinging said members together, said structure having respectively inner endwise aligned vertical parts secured against the inner end edges of and disposed in extended relation with respect to the opposed faces of said members, other coacting connected parts carried by the aligned inner ends of the vertical parts and spaced outwardly from the inner ends of said members for hinging said inner ends together and for permanently maintaining the said inner ends in spaced relation and other parts carried by and disposed at an angle to the vertical parts countersunk in the upper face of the compressing member and lower face of the base member and secured to said members, and a vertical knob extending from the upper face of said compressing member in proximity to the outer end of the latter.

2. A patty shaping device comprising a horizontally disposed rectangular freely movable base member having a flat uninterrupted upper face, a rectangular compressing member disposed in superposed relation with respect to said other member formed with a flat uninterrupted lower face, said compressing member normally inclined downwardly with respect to the horizontal, having its outer end terminal portion of its lower face normally seated upon the outer end terminal portion of the upper face of the base member and the remaining portion of its lower face permanently spaced from the remaining portion of the upper face of the base member, said members corresponding in width and length, a hinge structure abutting and secured to the inner end edges of said members and being so formed for permanently maintaining the inner end terminal portions of the opposed faces of said members in spaced relation, and a knob secured to the upper face of the compressing member in proximity to the outer end of the latter.

3. A patty shaping device comprising a horizontally disposed rectangular freely movable base member having a flat uninterrupted upper face, a rectangular compressing member disposed in superposed relation with respect to said other member formed with a flat uninterrupted lower face, said compressing member normally inclined downwardly with respect to the horizontal, having its outer end terminal portion of its lower face normally seated upon the outer end terminal portion of the upper face of the base member and the remaining portion of its lower face permanently spaced from the remaining portion of the upper face of the base member, said members corresponding in width and length, a hinge structure abutting and secured to the inner end edges of said members and being so formed for permanently maintaining the inner end terminal portions of the opposed faces of said members in spaced relation, and a knob secured to the upper face of the compressing member in proximity to the outer end of the latter, said hinged structure including superposed horizontally disposed parts countersunk in the upper face of the compressing member and the lower face of the base member at the inner end terminal portions of the outer faces of said members.

4. In a patty forming device, a freely movable base member, a compressing member disposed over the base member, said members corresponding in width and length and of rectangular form, means secured against the inner end edges of said members and countersunk in the outer faces of and secured to said members for pivotally connecting said members together and for permanently maintaining the major portion of the length of the inner face of the compressing member in superposed spaced relation with respect to the major portion of the length of the inner face of the base member and for disposing the remaining portion of the length of the inner face of the compressing member in superimposed relation with respect to the remaining portion of the length of the inner face of the base member, and a knob extended vertically from the outer face of the compressing member.

CLARENCE D. NEWLAND.